(12) United States Patent
Goldbrenner et al.

(10) Patent No.: US 10,592,487 B2
(45) Date of Patent: *Mar. 17, 2020

(54) THIRD PARTY FILES IN AN ON-DEMAND DATABASE SERVICE

(71) Applicant: salesforce.com, inc., San Francisco, CA (US)

(72) Inventors: David Goldbrenner, San Francisco, CA (US); Robert J. Snell, Edgware (GB); James Johnson, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/173,152

(22) Filed: Oct. 29, 2018

(65) Prior Publication Data

US 2019/0065537 A1 Feb. 28, 2019

Related U.S. Application Data

(63) Continuation of application No. 15/617,963, filed on Jun. 8, 2017, now Pat. No. 10,146,812, which is a
(Continued)

(51) Int. Cl.
*G06F 16/22* (2019.01)

(52) U.S. Cl.
CPC .................................. *G06F 16/22* (2019.01)

(58) Field of Classification Search
CPC ....................................................... G06F 16/22
See application file for complete search history.

(56) References Cited

U.S. PATENT DOCUMENTS

| 5,577,188 A | 11/1996 | Zhu |
| 5,608,872 A | 3/1997 | Schwartz et al. |

(Continued)

FOREIGN PATENT DOCUMENTS

EP 2860646 4/2015

OTHER PUBLICATIONS

U.S. Office Action dated Mar. 18, 2016 issued in U.S. Appl. No. 14/082,913.
(Continued)

*Primary Examiner* — Richard L Bowen
(74) *Attorney, Agent, or Firm* — Weaver Austin Villeneuve & Sampson LLP

(57) ABSTRACT

Disclosed are methods, apparatus, systems, and computer readable storage media for providing a reference to a content object in a user interface using an on-demand database service. A computing device can receive data regarding identification of a content object, where the content object is stored in a data repository external to the on-demand database service. The data regarding the content object can be stored in a persistent object in a database of the on-demand database service. A reference can be provided representing the persistent object to a display device operable to display the reference in a user interface when the display device accesses the on-demand database service. One or more graphical representations can be exposed regarding the content object for display in the user interface by the display device, where the exposed graphical representations depend at least in part on the data repository.

20 Claims, 12 Drawing Sheets

Related U.S. Application Data continuation of application No. 14/082,913, filed on Nov. 18, 2013, now Pat. No. 9,703,815.

(60) Provisional application No. 61/738,273, filed on Dec. 17, 2012.

(56) References Cited

U.S. PATENT DOCUMENTS

| | | | |
|---|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,874,001 B2 | 3/2005 | Narang et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,498,994 B2 | 7/2013 | Prabaker et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,221 B2 | 6/2014 | Prabaker et al. |
| 8,850,516 B1 | 9/2014 | Hrebicek et al. |
| 8,990,958 B2 | 3/2015 | Micucci et al. |
| 9,171,180 B2 | 10/2015 | Prabaker et al. |
| 9,424,283 B2 | 8/2016 | Prabaker et al. |
| 9,703,815 B2 | 7/2017 | Goldbrenner et al. |
| 9,747,388 B2 | 8/2017 | Micucci et al. |
| 9,805,051 B2 | 10/2017 | Bergner et al. |
| 9,892,177 B2 | 2/2018 | Maquaire et al. |
| 9,990,426 B2 | 6/2018 | Micucci et al. |
| 10,146,812 B2 | 12/2018 | Goldbrenner et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |

(56) References Cited

U.S. PATENT DOCUMENTS

| | | |
|---|---|---|
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0064434 A1* | 3/2006 | Gilbert .................. G06F 16/164 |
| 2008/0195483 A1 | 8/2008 | Moore |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0293066 A1 | 11/2009 | Low |
| 2010/0185650 A1 | 7/2010 | Topatan et al. |
| 2010/0312724 A1 | 12/2010 | Pinckney et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2012/0297450 A1 | 11/2012 | Whittick et al. |
| 2013/0212453 A1 | 8/2013 | Gugal et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0019559 A1 | 1/2015 | Maquaire et al. |
| 2015/0095162 A1 | 4/2015 | Jakobson et al. |
| 2015/0142596 A1 | 5/2015 | Jakobson et al. |
| 2015/0143503 A1 | 5/2015 | Micucci et al. |
| 2015/0172563 A1 | 6/2015 | Jakobson et al. |
| 2017/0024577 A1 | 1/2017 | Prabaker et al. |
| 2017/0075919 A1 | 3/2017 | Bose et al. |
| 2017/0329864 A1 | 11/2017 | Micucci et al. |
| 2018/0011883 A1 | 1/2018 | Goldbrenner et al. |
| 2018/0121440 A1 | 5/2018 | Maquaire et al. |
| 2018/0260579 A1 | 9/2018 | Bose et al. |

OTHER PUBLICATIONS

U.S. Final Office Action dated Oct. 11, 2016 issued in U.S. Appl. No. 14/082,913.

U.S. Notice of Allowance dated Mar. 8, 2017 issued in U.S. Appl. No. 14/082,913.

U.S. Office Action dated Jan. 24, 2018 issued in U.S. Appl. No. 15/617,963.

U.S. Notice of Allowance dated Jul. 30, 2018 issued in U.S. Appl. No. 15/617,963.

Conner, Nancy, "Google Apps: The Missing Manual, 1st Edition," Chapters Introduction, 2.2, 2.4, 2. 7 and 2.8, Jun. 3, 2008, all pages.

"Google Plus Users", Google+Ripples, Oct. 31, 2011 [retrieved on Feb. 21, 2012 from Internet at http://www.googleplusers.com/google-ripples.html], 3 pages.

* cited by examiner

Insert
*Provide values for the ContentVersion fields below:* — 401

| Field — 402 | Value | Smart Lookup ❓ |
|---|---|---|
| ContentDocumentID | | ▶ — 404 |
| ContentLocation — 405 | E | |
| ContentUrl | | |
| Description | | |
| ExternalDataSourceId — 406 | 0XCD00000000005Q | ▶ |
| ExternalDocumentInfo1 — 407 | /Shared%20Documents/Sales%205 | |
| ExternalDocumentInfo2 | | |
| FirstPublishLocationId | | ▶ |
| Origin — 408 | H | |
| OwnerId | | ▶ |
| PathOnClient — 409 | Sales%Strategies%202012.doc | |
| ReasonForChange | * | |
| TagCsv | | |
| Title — 410 | Sales Strategies 2012 | |
| VersionData | | |

[Confirm Insert]

THIRD PARTY FILES IN AN ON-DEMAND DATABASE SERVICE

PRIORITY DATA

This patent document is a continuation of and claims priority to co-pending and commonly assigned U.S. patent application Ser. No. 15/617,963, titled "Third Party Files In An On-Demand Database Service," by Goldbrenner et al., filed on Jun. 8, 2017, which is a continuation of U.S. patent application Ser. No. 14/082,913, titled "Third Party Files In An On-Demand Database Service," by Goldbrenner et al., filed on Nov. 18, 2013, which claims priority to U.S. Provisional Patent Application No. 61/738,273, titled "Third Party Chatter Files," by David Goldbrenner, filed on Dec. 17, 2012. Each of U.S. patent application Ser. No. 15/617, 963, U.S. patent application Ser. No. 14/082,913 and U.S. Provisional Patent Application No. 61/738,273 is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to providing a reference to a content object in a user interface using an on-demand database service and, more specifically, to techniques for providing a reference to a content object stored in a data repository external to an on-demand database service.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Various content files and folders can be accessed in a cloud computing context. However, many of the content files and folders are stored across multiple data repositories. As such, it can be difficult to connect, access, and search for desired data across the multiple data repositories. It can also be difficult for users to share such content and collaborate with each other regarding the content in a cloud computing context, such as an online social network. Such difficulties can be exacerbated where the tools and techniques for providing access and referencing such content are limited.

BRIEF DESCRIPTION OF THE DRAWINGS

The included drawings are for illustrative purposes and serve only to provide examples of possible structures and operations for the disclosed inventive systems, apparatus, and methods for providing a reference to a content object in a user interface using an on-demand database service. These drawings in no way limit any changes in form and detail that may be made by one skilled in the art without departing from the spirit and scope of the disclosed implementations.

FIG. 4 shows an example of an application programming interface (API) for creating a persistent object corresponding to the content object.

FIG. 6B shows an example of the user interface of FIG. 6A updated to include a published feed item having a reference corresponding to a content object stored in the external content management data repository.

FIG. 9 shows an example of a user interface including a detailed information page displaying data regarding a persistent object from FIGS. 7 and 8.

DETAILED DESCRIPTION

Figure 1A:
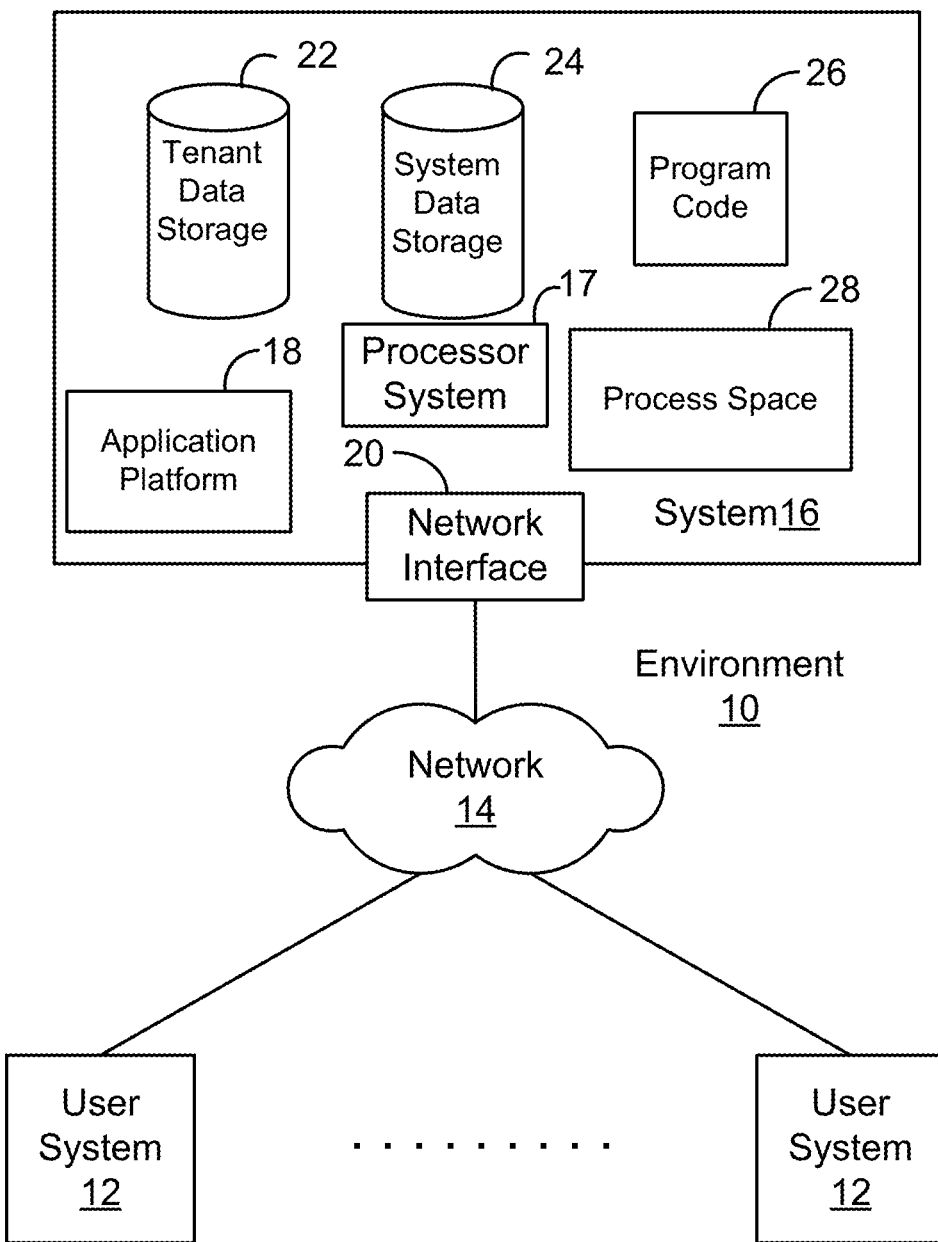
FIG. 1A shows a block diagram of an example of an environment 10 in which an on-demand database service can be used in accordance with some implementations.

Examples of systems, apparatus, methods and computer-readable storage media according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer-readable storage media for providing a reference to a content object in a user interface using an on-demand database service. The on-demand database service can include online business applications and online social networks, also referred to herein as a social networking system.

Online social networks are increasingly becoming a common way to facilitate communication among people, any of whom can be recognized as users of a social networking system. One example of an online social network is Chatter®, provided by salesforce.com, inc. of San Francisco, Calif. salesforce.com, inc. is a provider of social networking services, customer relationship management (CRM) services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some online social networks can be implemented in various settings, including organizations. For instance, an online social network can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some online social networks, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, an online social network may allow a user to follow data objects in the form of records such as cases, accounts, or opportunities, in addition to following individual users and groups of users. The "following" of a record stored in a database, as described in greater detail below, allows a user to track the progress of that record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of an online social network. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within an online social network, an email notification or other type of network communication may be transmitted to all users following the user, group, or object in addition to the inclusion of the data as a feed item in one or more feeds, such as a user's profile feed, a news feed, or a record feed. In some online social networks, the occurrence of such a notification is limited to the first instance of a published input, which may form part of a larger conversation. For instance, a notification may be transmitted for an initial post, but not for comments on the post. In some other implementations, a separate notification is transmitted for each such information update.

Some implementations of the disclosed systems, apparatus, methods, and computer readable storage media are configured to provide a reference to a content object in a user interface using an on-demand database service. A computing device such as a server may receive data regarding identification of a content object, where the content object is stored in a data repository external to the on-demand database service. Data regarding identification of the content object may be stored in a persistent object in a database of the on-demand database service. A reference representing the persistent object may be provided to a display device operable to display the reference in a user interface when the display device accesses the on-demand database service. One or more graphical representations regarding the content object may be exposed for display in the user interface by the display device, where the exposed graphical representations depend at least in part on the data repository. In some implementations, the data regarding identification of the content object can include a Uniform Resource Locator (URL) or a unique content object identifier.

As more and more users and organizations move toward more collaborative sharing models to communicate and conduct business, there is a desire to better access, expose, and utilize content. Content may be fragmented across a number of data sources outside of an on-demand database service. For example, the on-demand database service may be operated by or on behalf of a first service provider, such as an organization or other type of entity, while the "outside" data sources are operated by or on behalf of a different second service provider. Conventionally, access to such content and sharing such content may be limited in an online social network or online business application, since different service providers generally have different and separately maintained security models restricting access to their respective services.

Some of the implementations described herein are directed to providing a reference to external content stored in an external data repository, where "external" refers to repositories maintained by other entities than the service provider providing a given on-demand database service. The reference can represent a persistent object that behaves like a record stored in the on-demand database service. The persistent object can be indexed, searched, commented upon, recommended to other users, liked, shared, accessed, propagated, edited, updated, deleted, and otherwise interacted with in the on-demand database service. A persistent object can correspond to an external content object and allow an entity to access the external content object via a URL or unique content object identifier. In some instances, the persistent object includes some attributes of the external content object as well as other attributes described in greater detail below, and, in some instances, the persistent object is not synchronized with the external content object. The persistent object can be provided using the on-demand database service and enables access to the external content object via the URL or unique content object identifier, but allows indexing, searching, commenting, recommending, liking, sharing, accessing, integrating, collaborating, propagating, editing, updating, deleting, and other actions to take place in relation to the persistent object using the on-demand database service as if the external content object were hosted by the on-demand database service.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

I. General Overview

Systems, apparatus, and methods are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
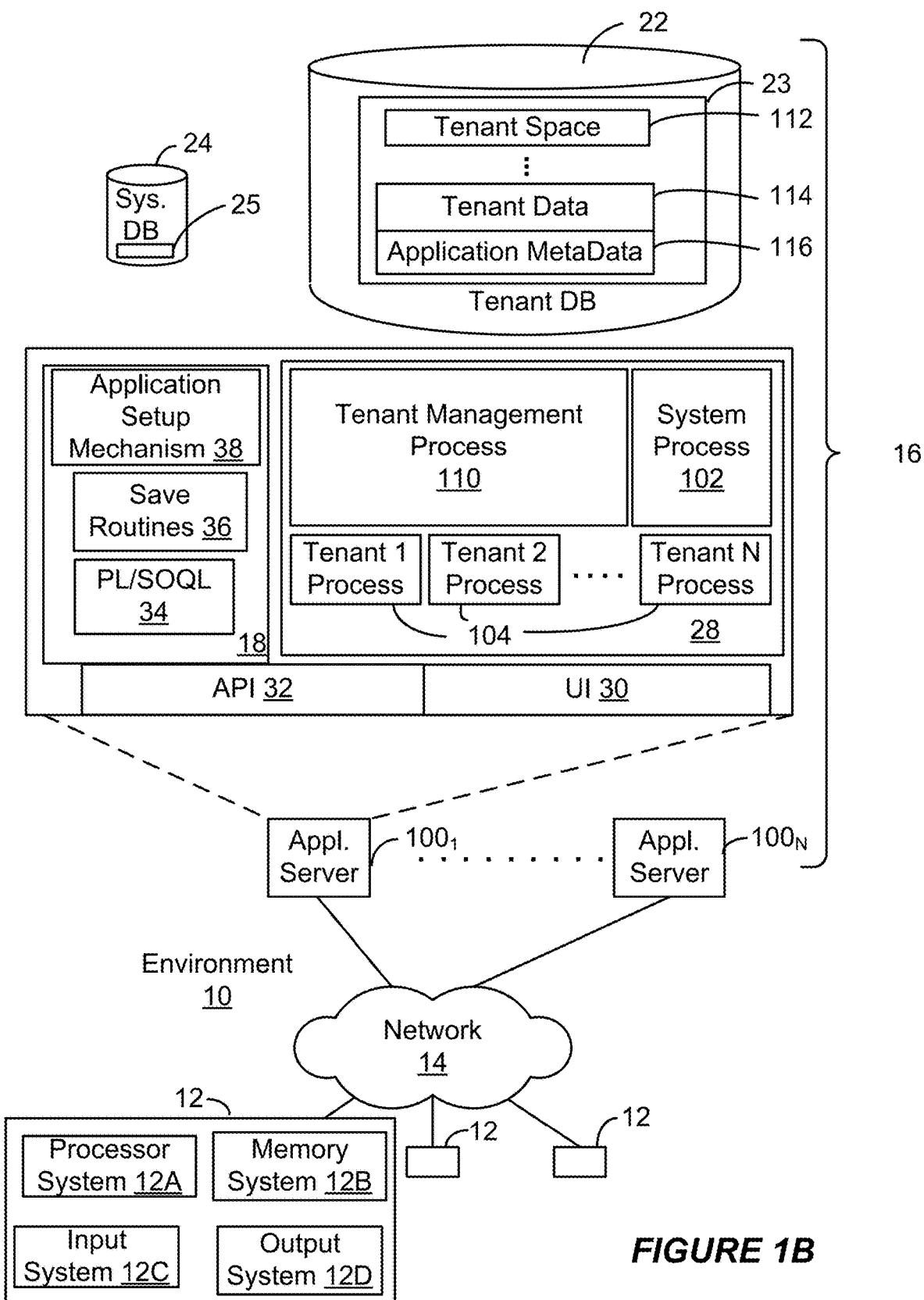
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 100 1-100 N, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oracle☐ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 1001 might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
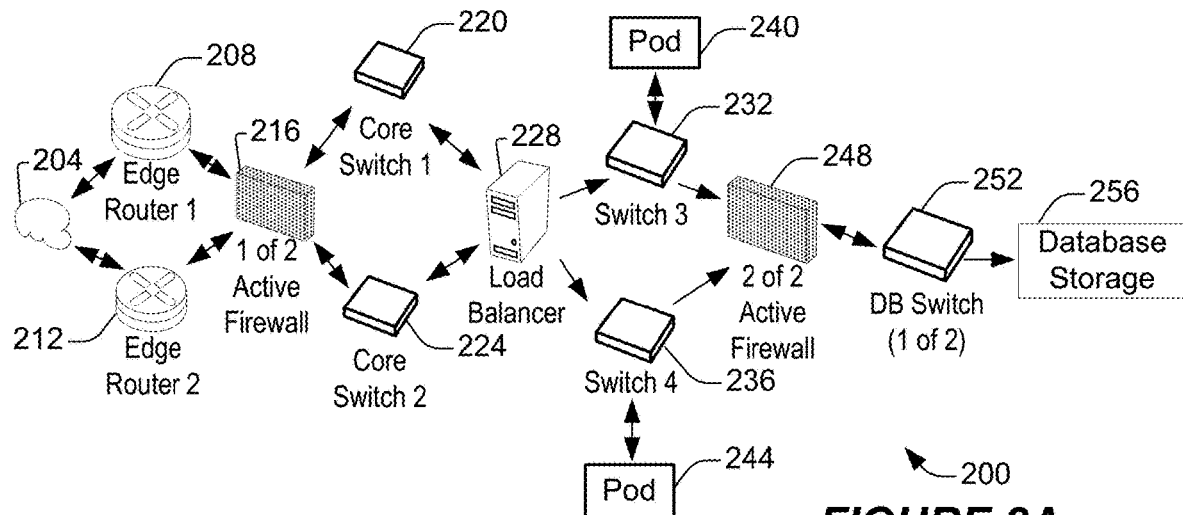
FIG. 2A shows a system diagram illustrating an example of architectural components of an on-demand database service environment 200 according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
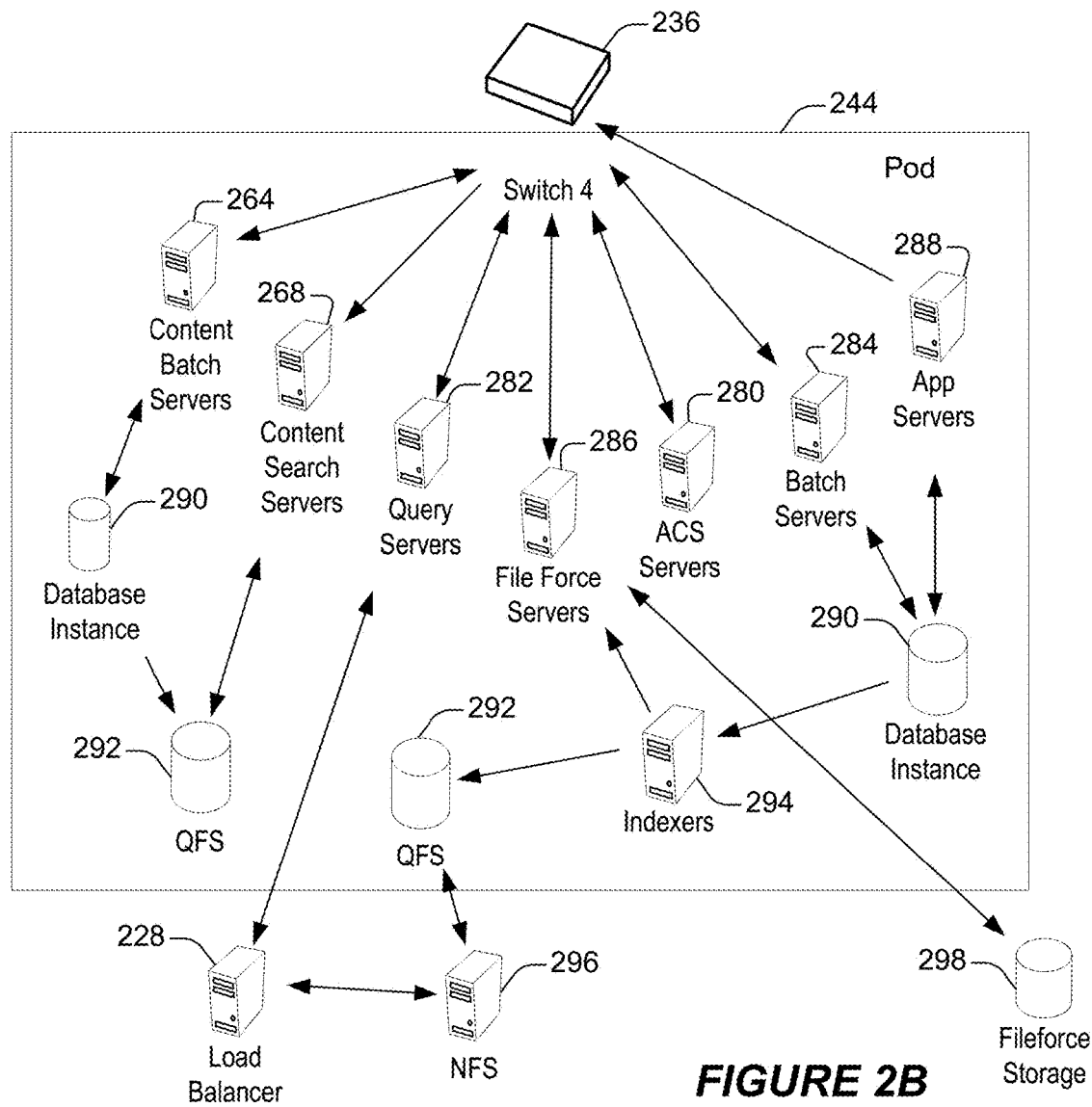
FIG. 2B shows a system diagram further illustrating an example of architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file force servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 15-22. In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file force servers 286 may manage requests for information stored in the Fileforce storage 298. The Fileforce storage 298 may store information such as documents, images, and basic large objects (BLOB s). By managing requests for information using the file force servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file force servers 286 and/or the QFS 292.

III. Providing a Reference to a Content Object

Content can be scattered across many different network domains on the Internet. Such content can be stored in various data repositories or data sources that are hosted on different network domains from an on-demand database service. Typically, users can access third-party content from the on-demand database service via a URL. However, users may be limited in their ability to integrate, share, and collaborate with third-party content using the on-demand database service.

In some of the disclosed implementations, an on-demand database service can essentially host third-party content through a persistent object. The persistent object may be displayed as a reference in a user interface like a hyperlink that enables a user to access third-party content via a URL or other unique content object identifier. The persistent object behaves as a content object stored in the on-demand database service. The persistent object can include information related to identification of the third-party content. Some of the identifying characteristics or capabilities of the third-party content may be exposed in a user interface of a user's computing device accessing the on-demand database service. Accordingly, the persistent object can simultaneously represent the third-party content and provide a hyperlink to the third-party content. Thus, even though the on-demand database service does not natively store third-party content in one of its databases, it can still provide representation of the third-party content using a persistent object provided in the on-demand database service. As a result, users can index, search, comment, recommend, like, share, access, collaborate, integrate, propagate, edit, update, delete, and otherwise interact with third-party content via the persistent objects using the on-demand database service.

Figure 3:
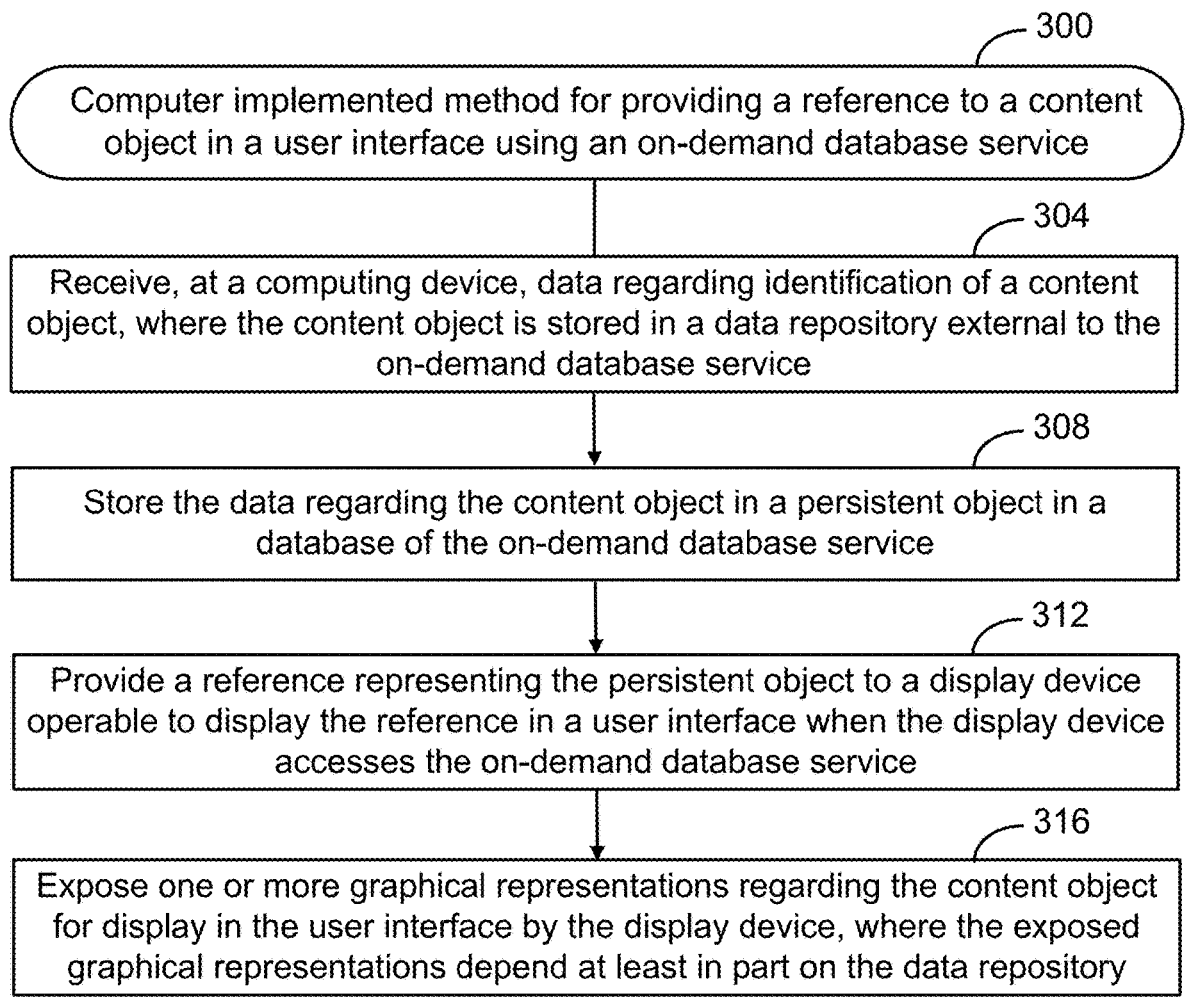
FIG. 3 shows a flowchart of an example of a computer implemented method for providing a reference to a content object in a user interface using an on-demand database service, performed in accordance with some implementations.

FIG. 3 shows a flowchart of an example of a computer implemented method for providing a reference to a content object in a user interface using an on-demand database service, performed in accordance with some implementations. The method 300 is described with reference to some examples illustrated in FIGS. 4-10.

At block 304 of the method 300, data regarding identification of a content object is received at a computing device, where the content object is stored in a data repository external to the on-demand database service. Content objects can include metadata as well as the actual content itself. Content objects can include content files and/or folders. However, it is understood that content objects are not limited to files and folders, but can include data of any type. Content files can include any file types, including text, audio, video, image, and/or other file. Content objects may be stored in various data repositories and hosted in network domains different than the on-demand database service.

In some implementations, the on-demand database service can include cloud-based services, including online business applications and online social networks. An online social network, such as Chatter®, facilitates communication and collaboration among entities. The online social network can be managed and controlled by a database service provider, such as salesforce.com. The online social network may also facilitate usage of other online services, including CRM services and database management services. The on-demand database services can also include online business applications, including but not limited to task management services (e.g., do.com™), CRM services (e.g., Salescloud®), customer services (Service Cloud®) and desk.com™), performance management services (e.g., Rypple® and work.com), social marketing services (e.g., Radian6® and Buddy Media™), content and/or data management services (e.g., database.com™, data.com®), platform services (e.g., site.com™, Heroku™, force.com®, AppExchange®).

The data repository is external to the on-demand database service and can store one or more content objects. In some implementations, the data repository is "external" in that it is hosted on a network domain separate from the network domain of the on-demand database service. As used herein, the data repository can also be referred to as a "third-party repository" and the content object stored in the data repository can also be referred to as a "third-party file."

In some implementations, the data repository can include a content management repository provided by a service provider such as Dropbox, Box.net, Google Drive, SharePoint, FileNet, Documentum, and Skydrive. Nonetheless, the data repository can include any repository for storage of any data type. For example, a piece of formatted text or excerpt from a webpage can be stored in EverNote, a video can be stored in YouTube or Vimeo, an image can be stored in Flickr, a business report can be provided in SAP or Oracle, a search result can be provided in Google, etc. The content in any of these data repositories can be referenced by a URL. A user in the on-demand database service may access the content of the content object using the URL.

A process call can be made to the content object or third-party file stored in the data repository. The process call can include instructions for locating and retrieving the content object so that the content object can be delivered to an end user. However, the content object does not necessarily leave its data repository. Instructions can include data regarding identification of the content object. In some implementations, data regarding identification of the content object can include a URL to the content object or a unique content object identifier (ID) to the content object. Data regarding identification of the content object can further include a title, a source, an author, and other metadata. In some implementations, the data regarding identification of the content object can be provided by an entity and received at a computing device.

In some implementations, the data regarding identification of the content object can be provided by user input via an API. FIG. 4 shows an example of an API for creating a persistent object corresponding to the content object. A process call to the content object can be made via the persistent object. The persistent object can be created using the data regarding identification of the content object.

As illustrated in the example in FIG. 4, the API 400 includes a table 401 having a plurality of fields 402. Each of the fields 402 can represent data fields for identifying a content object stored in a data repository. A user can provide data regarding identification of the content object by manually inputting values into each of the values 403 of the table 401. In some implementations, the user can provide values by applying a "smart lookup" 404 to select values that can be automatically generated.

Figure 10:
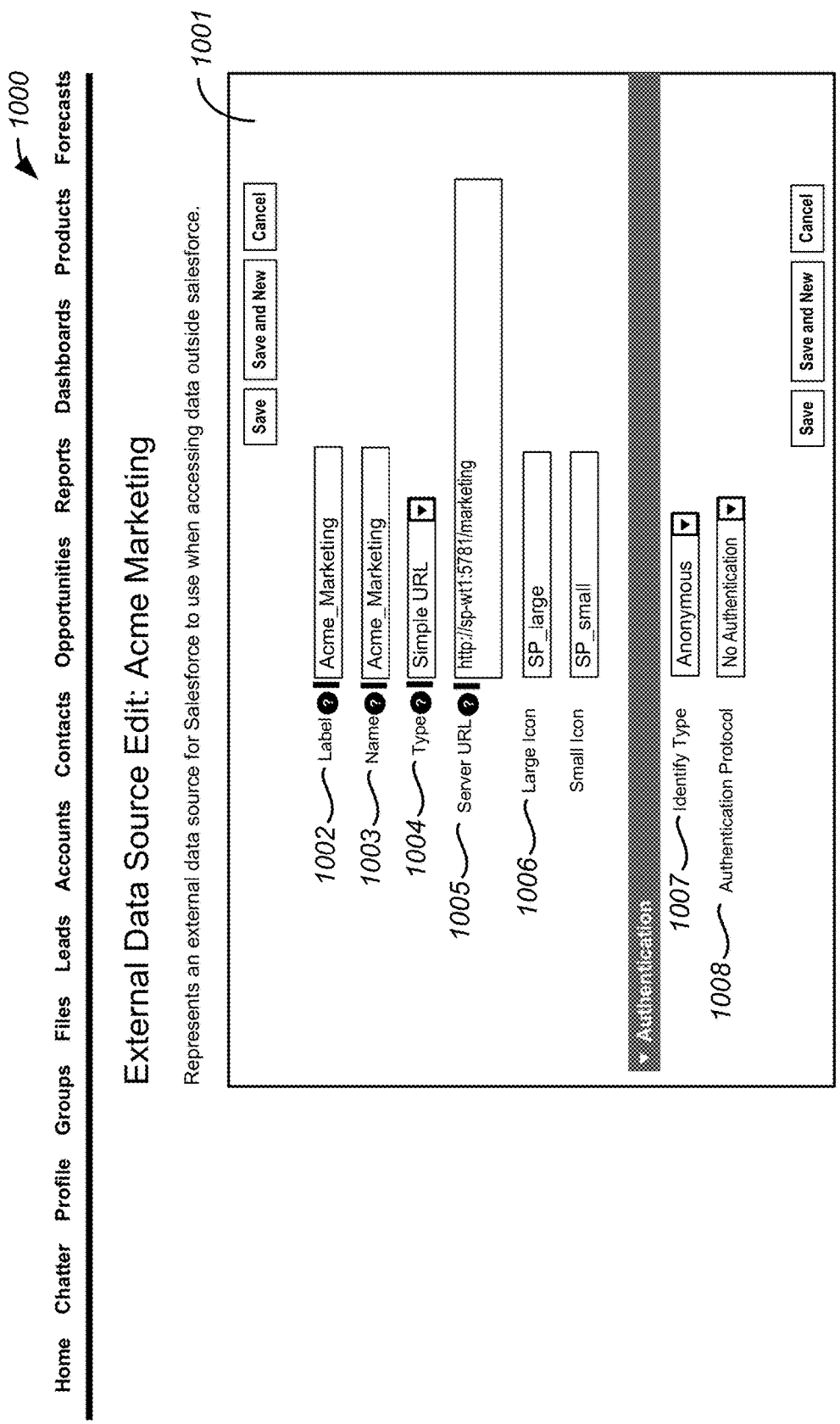
FIG. 10 shows an example of a user interface for identifying an external content management data source to access.

In providing data regarding identification of the content object, a content location 405 can be identified. In the example in FIG. 4, a value of "E" is indicated to show that the content location 405 is external to the on-demand database service. In addition, an External Data Source ID 406 can be identified to determine the source of the content object. The value in the External Data Source ID 406 can be represented by a string of characters indicating a unique ID of the external data repository, which can be scraped from a browser URL bar when viewing the external data repository. Alternatively, the External Data Source ID 406 can be specified from another API as shown in FIG. 10. Under External Document Info1 407, a string of characters can be indicated to show the URL or remainder of the URL pointing to the content object. The External Data Source ID 406 and the External Document Info1 407 can collectively provide the URL to the content object. Furthermore, an origin 408 can be specified by the user to indicate what kind of object the persistent object will be and where the persistent object will be stored. In FIG. 4, a value of "H" is provided to show that the persistent object will be a Chatter file and stored in a database in Chatter. A Path On Client 409 can be specified to indicate the original source of content object and the content object's extension. This data can be used to open the appropriate application when accessing the content object. For example, the document extension of *.doc can provide instructions to the computing device to open the content object using Microsoft Word or other word processing application. A Title 410 can be provided to indicate the title of the content object for display in a user interface.

In some implementations, the data regarding identification of the content object can be automatically generated. In particular, the values for providing identification of the content object can be automatically generated based on previously known values or default values. Rather than manually entering data regarding identification of the content object, such data can be machine- or system-generated. For example, identification of the URL of the content object or the ID of the source can automatically generate a value for Content Location 405. In another example, identification of the URL or can automatically generate a value for the Title 410 by scraping a portion of the URL.

In some implementations, the data regarding identification of the content object may be provided in a manner other than through API 400, such as through computer programming instructions shown below:

var cv=new sforce.SObject("ContentVersion");
    cv.Origin='H'; cv.ContentLocation='E';
    cv.ExternalDataSourceId='OXCD0000000005z';
    cv.ExternalDocumentInfo1='/sites/sfde/sandbox/
      Shared%20Documents/
      Marketing%20brochure.docx';
    cv.PathOnClient='https://sp.marketing.fisker.com/sites/
      sfdc/sandbox/SharedDocuments/Fiskermarketing-
      guidelines.docx';
    cv.Title='Fisker Marketing Guidelines";
    sforce.connection.create([cv]);

In some implementations, the data regarding identification of the content object may be retrieved from the external data repository. As will be discussed in more detail below with respect to FIGS. 6A and 6B, a browser plug-in or other client application may enable communication between the external data repository and the on-demand database service. By way of an example, such communication may facilitate publication of an external content object to a social layer (e.g., information feed) of the on-demand database service from the external data repository. The data regarding identification of the content object may be automatically generated by pulling data from the external data repository. Such data can be provided in a persistent object corresponding to the content object and stored in a database of the on-demand database service.

In some implementations, identification of the external data repository can be independently specified through an API. FIG. 10 shows an example of a user interface for identifying an external content management data source to access. A user interface 1000 can provide an API 1001 for defining the location of the server on which the external content object resides. In some implementations, the user can be a system administrator who can define as many data repositories external to the on-demand database service as desired. The user can provide a Label 1002 for the external data repository, which is the name of the external data repository to be displayed to users in the on-demand database service. The user can provide a Name 1003 for the external data repository, which can refer to the internal name of the external data repository. The user can further identify a Type 1004 for establishing the type of connection to access the external data repository, which can be through a simple URL. Furthermore, the user can specify the server URL 1005 in which the external data repository resides, and the user can select an icon 1006 to represent the external data repository. Additionally, the user can choose the means of authenticating the user to the external data repository by selecting the Identity Type 1007 (e.g., per user or anonymous) and Authentication Protocol 1008 (e.g., no authentication or basic authentication). Authentication can including providing the username and password credentials to authenticate from the on-demand database service or having the authentication occur at the external data repository.

In essence, any content or data object with a URL or other unique ID can be referenced to the computing device. Content in EverNote, documents in Dropbox, videos from YouTube, photos from Flickr, search results from Google, reports in SAP or Oracle, and all types of external content can be referenced to the computing device for identification. The data provided regarding identification of the content object can be used for creating a persistent object in a database of the on-demand database service.

Returning to FIG. 3, at block 308 of the method 300, the data regarding identification of the content object is stored in a persistent object in a database of the on-demand database service. In some implementations, the persistent object can have a database structure in the form of a table with various data fields logically arranged as columns. For example, the persistent object can represent a content folder including a plurality of content files, where each row can represent a content file and the columns can represent metadata. Alternatively, the persistent object can be represented as a single row in a larger database table. For example, the row can represent a content file and the columns in the database table can represent metadata, including but not limited to a title, a description, a source, a unique ID, an author, a created date, a date modified, and a URL. A persistent object in the database table may provide at least some values for the one or more data fields, though some of the data fields may be left blank.

While the persistent object does not store actual content (e.g., blob) of a content object, the persistent object can act and behave like a content object (e.g., record). The persistent object represents the corresponding content object by including a pointer (e.g., URL) to the actual content of the content object. However, the persistent object has a data structure like any other content object that may be native to the on-demand database service. In other words, the persistent object behaves and functions like a record in the on-demand database service. The difference is that the persistent object may include different data fields from a record, including data identifying the content object and an indicator that the content object is external. By way of an example, the persistent object in the database can indicate that there's an external SharePoint document with a unique ID of 123456789 and located on the SharePoint server at www.office.microsoft.com/sharepoint/123456789.doc. The persistent object can maintain a persistent relationship with the database in the on-demand database service, regardless of changes made or interactions performed in the external data repository.

At block 312 of the method 300, a reference representing the persistent object is provided to display the reference in a user interface when the display device accesses the on-demand database service. The reference can serve as a hyperlink to take an entity directly to the URL of the content object. The reference can be a selectable component, including but not limited to an icon, a button, or a string of characters. Selection of the reference can initiate an action, such as opening the content object via the URL, downloading the content object via the URL, and opening a detailed information page view regarding the persistent object.

In some implementations, providing the reference includes receiving a signal from the data repository or from the on-demand database service to provide the reference. In some implementations, the reference may be provided following a user-initiated action. The reference may be provided in a social layer of the on-demand database service, such as a group, a record, an organization, a content management files list, an information feed, or a user profile. This enables the persistent object to be shared across a plurality of users for collaboration. Users can access, share, search, index, comment, recommend, edit, update, delete, and interact with the persistent object as if the persistent object were any other record in the on-demand database service. In one example, a user can publish the persistent object from SharePoint to a Chatter feed, as will be discussed in more detail with respect to FIGS. 6A and 6B. In another example, a user can publish the persistent object from Chatter and into a Chatter feed.

Interactions with the persistent object can depend on contextual information associated with the persistent object. In some implementations, the persistent object can be recommended to users. A recommendation to a user can be based on the activity of the user and/or based on the activity of other users with respect to the persistent object. In some implementations, the persistent object can be edited, updated, or deleted. The ability to edit, update, or delete can be based on a user's privileges, which can be determined dynamically. For instance, when the persistent object has been linked to or attached to one or more records within the database of the on-demand database service, a user's privilege to interact with the persistent object can be based on the user's privilege with respect to the one or more records within the database.

Figure 7:
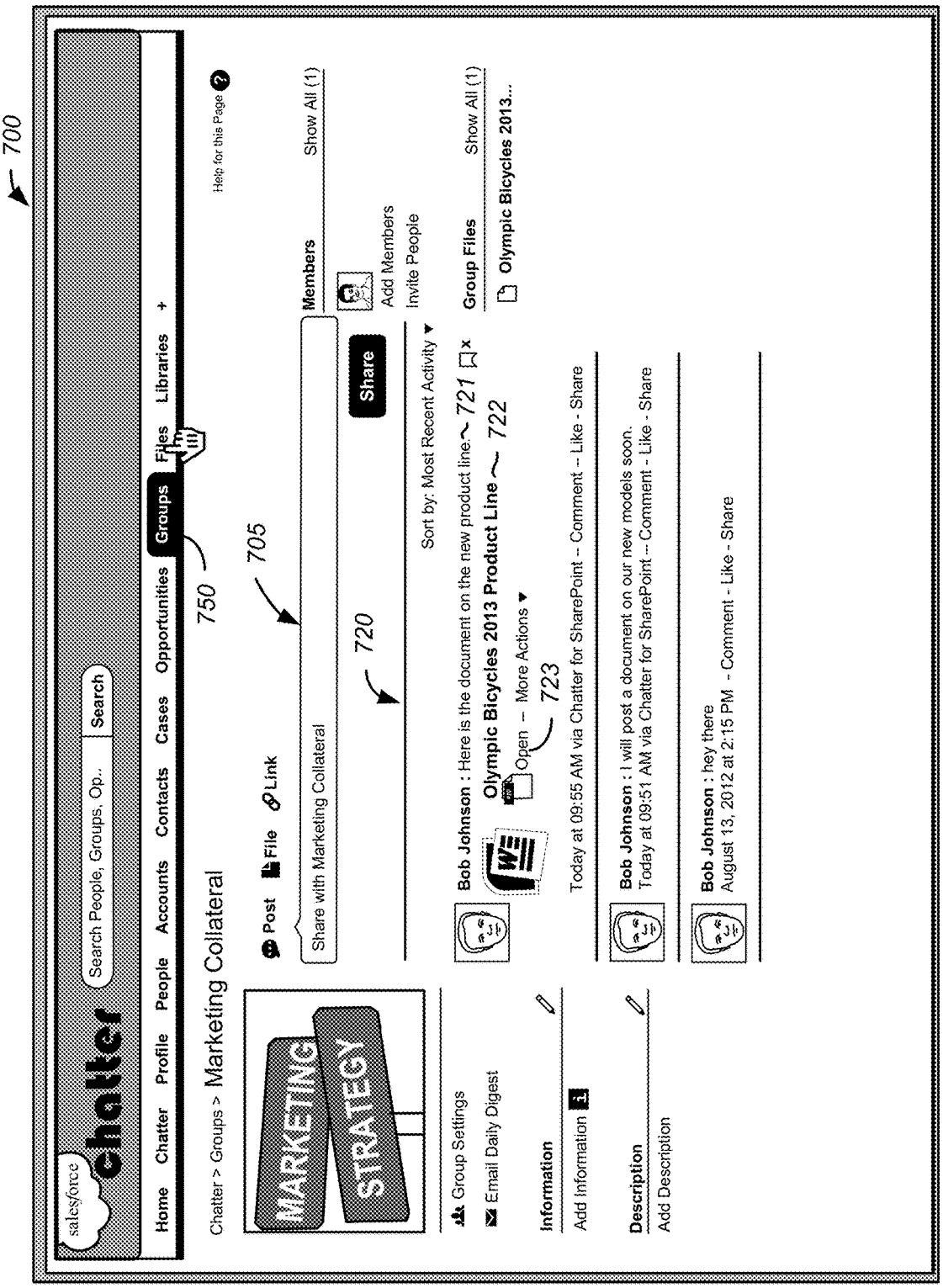
FIG. 7 shows an example of another user interface with the published feed item in FIG. 6B having the reference corresponding to the content object stored in the external content management data repository.

In some implementations, providing the reference includes presenting the reference to a display device operable to display the reference in an information feed when the display device accesses the on-demand database service. FIG. 7 shows an example of a user interface with a feed item having a reference representing a persistent object in an information feed. In FIG. 7, a user interface 700 can be displayed in an online social network for a group 750. The user interface 700 can include a publisher 705 and an information feed 720, where the publisher 705 may be configured to publish information to the information feed 720. The information feed 720 can include a plurality of feed items related to the group 750. A feed item 721 can include a reference 722, which can represent a persistent object corresponding to a Microsoft Word document entitled "Olympic Bicycles 2013 Product Line." The Microsoft Word document may be stored in an external data repository, such as SharePoint. A user may initiate an action by clicking a selectable component 723. The action can open the content object via a URL stored in the persistent object upon clicking the selectable component 723.

Figure 8:
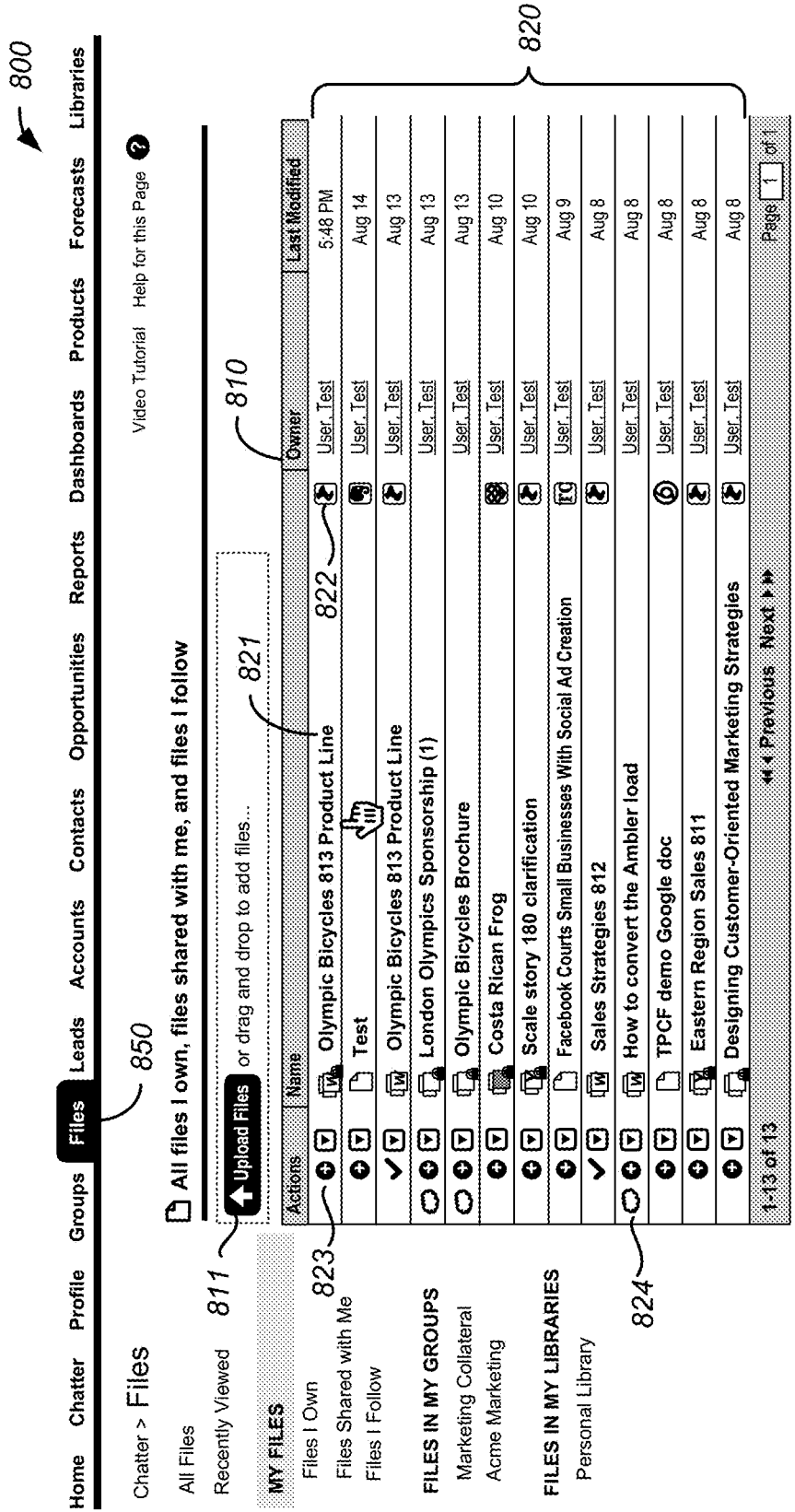
FIG. 8 shows an example of a user interface displaying a content files list including the reference corresponding to the content object stored in the external content management data repository of FIG. 7.

In some implementations, providing the reference includes presenting the reference to a display device operable to display the reference in a content management files list when the display device accesses the on-demand database service. FIG. 8 shows an example of a user interface of a content management files list presenting a reference representing the persistent object. In FIG. 8, a user interface 800 can be displayed for a files tab 850. The files tab 850 can include a content management files list 810 that includes a plurality of files 820. The plurality of files 820 may be integrated across the on-demand database service for an entity, including native files and external files. Therefore, as shown in the example in FIG. 8, the content management files list 810 can include one or more references to persistent objects corresponding to external content objects as well as one or more references to files stored in the database of the on-demand database service. A reference 821 can represent a persistent object corresponding to a file stored in an external data repository. The reference 821 may be accompanied with an icon 822 indicating the source of the file, such an icon for SharePoint. Other references in the plurality of files 810 may have an icon 824 indicating that the file is native to the on-demand database service. A user may initiate an action by clicking a selectable component 823, which may be configured to open the file, download the file, or open a detailed information page view regarding the file.

Returning to FIG. 3, at block 316 of the method 300, one or more graphical representations regarding the content object are exposed for display in the user interface by the display device, where the exposed graphical representations depend at least in part on the data repository. The one or more graphical representations can accompany the reference in the user interface. The one or more graphical representations can be displayed in the form of GUI buttons, links, tabs, channels, icons, images, animations, menus, string of characters, and the like.

What is exposed in the user interface can depend on the source of the content object. If the source of the content object is Dropbox, a graphical representation can indicate such information by showing an icon representing Dropbox. The persistent object as rendered in the user interface can present both (1) a reference directing a user to a content object via a URL or unique content object ID and (2) one or more graphical representations that are "polymorphic." What this means is that the persistent object can identify its source and render different information or representations of information depending on its identified source in the user interface.

In some implementations, the one or more graphical representations can include metadata, where metadata is rendered depending on the identified source of the content object. Metadata can include but is not limited to at least one of a title, a source, a file size, an author, a created date, a last modified timestamp, etc. Thus, what metadata is exposed regarding the content object can depend on the identified source of the content object.

In some implementations, the one or more graphical representations can include one or more selectable components configured to interact with the content object. Once the source of the content object is identified, the one or more graphical representations can provide different capabilities and functions depending on the source of the content object without actually retrieving the content object from the source itself. By way of an example, if a reference to a SharePoint document is provided in the user interface, a selectable component can accompany the reference to allow a user to "Check In" or "Check Out" the SharePoint document. In another example, if a reference to an EverNote file is provided in the user interface, a selectable component can accompany the reference to allow a user to author directly into the EverNote file within a preview window. In some implementations, interactions via the selectable components are made to the persistent object and subsequently written to the corresponding content object.

Figure 5:
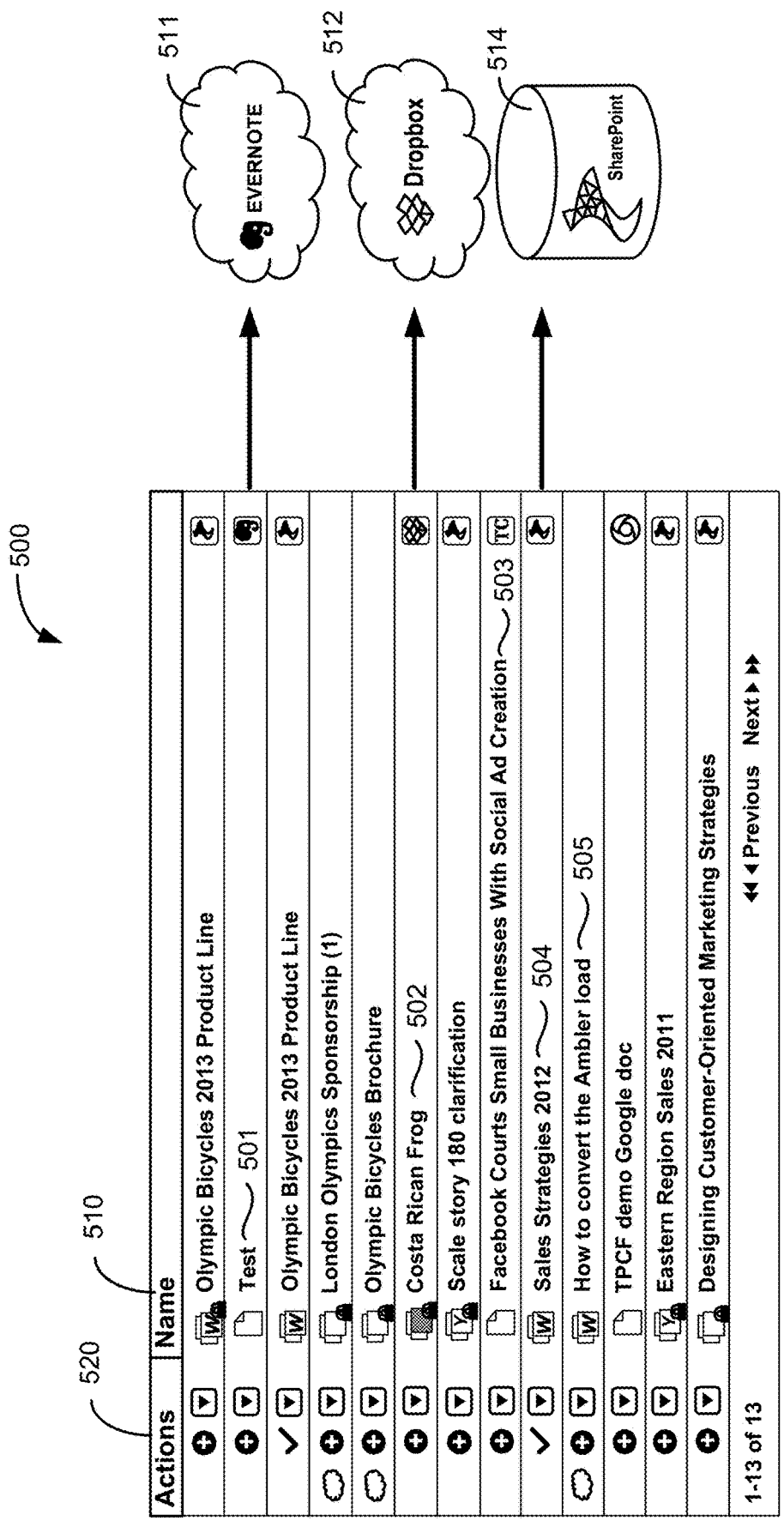
FIG. 5 shows an example of a user interface including a plurality of references representing persistent objects for content stored in a plurality of external data repositories.

FIG. 5 shows an example of a user interface including a plurality of references representing persistent objects for content stored in a plurality of external data repositories. A user interface 500 can display a plurality of files in a single portal regardless of whether the files are external to a database or the files are native to the database. Hence, a user can be provided with unified access to all their files located across many different data sources, allowing both third-party content files and native content files to be accessed using the on-demand database service.

In FIG. 5, the user interface 500 can include a plurality of files organized under Name 510 and accompanied with Actions 520. Under Name 510, each of the files can include a title identifying a name for the file. Each of the files can include a first icon to the left of its name identifying the type of file, such as a Microsoft Word document, a Microsoft Excel spreadsheet, a JPEG image, etc. In some implementations, the first icon may include a lock symbol to indicate that the file has restrictions for access. Each of the files can also include a second icon to the right of its name identifying the source of the file, such as EverNote, Dropbox, SharePoint, etc. An EverNote file 501 named "Test" can display an EverNote icon 511, a JPEG image 502 named "Costa Rican Frog" can display a Dropbox icon 512, and a Microsoft Word document file 504 named "Sales Strategies 2012" can display a SharePoint icon 514. Each of the icons 511, 512, and 514 can be rendered into the user interface upon identification of the source of the external file. The rendering of the icons 511, 512, and 514 may be independent of user input directly generating the icons. Some of the icons 511, 512, and 514 may be generated from specifying an external data repository in an API, such as in FIG. 10. Some files may simply reference content stored on a website, such as a Tech Crunch article 503 on www.techcrunch.com. Other files may reference content native to the on-demand database service, such as the Microsoft Word document file 505 entitled "How to convert the Ambler load." Actions 520 allow a user to initiate actions on the files, such as opening the file, downloading the file, or opening a detailed information page view regarding the file.

In some implementations, the method 300 can further include receiving a user input selecting the reference. The user input may be transmitted to the computing device as a signal to initiate an action with respect to the content object. The signal can include instructions requesting access to the content object in the data repository, where the request includes a URL or a unique content object ID. The URL or unique content object ID may be taken from the persistent object when the reference is selected. The action can then initiate opening or downloading the content object from the data repository to be delivered to the user.

Even when the user requests access to an external content object to interact with the external content object, the external content object continues to remain in its original source. In some instances, the external content object may not get copied and duplicated into the database of the on-demand database service. Furthermore, security and access permissions may be controlled by the original source. When a user is taken to the content object for access, authentication can occur at the source of the content object.

Figure 9:
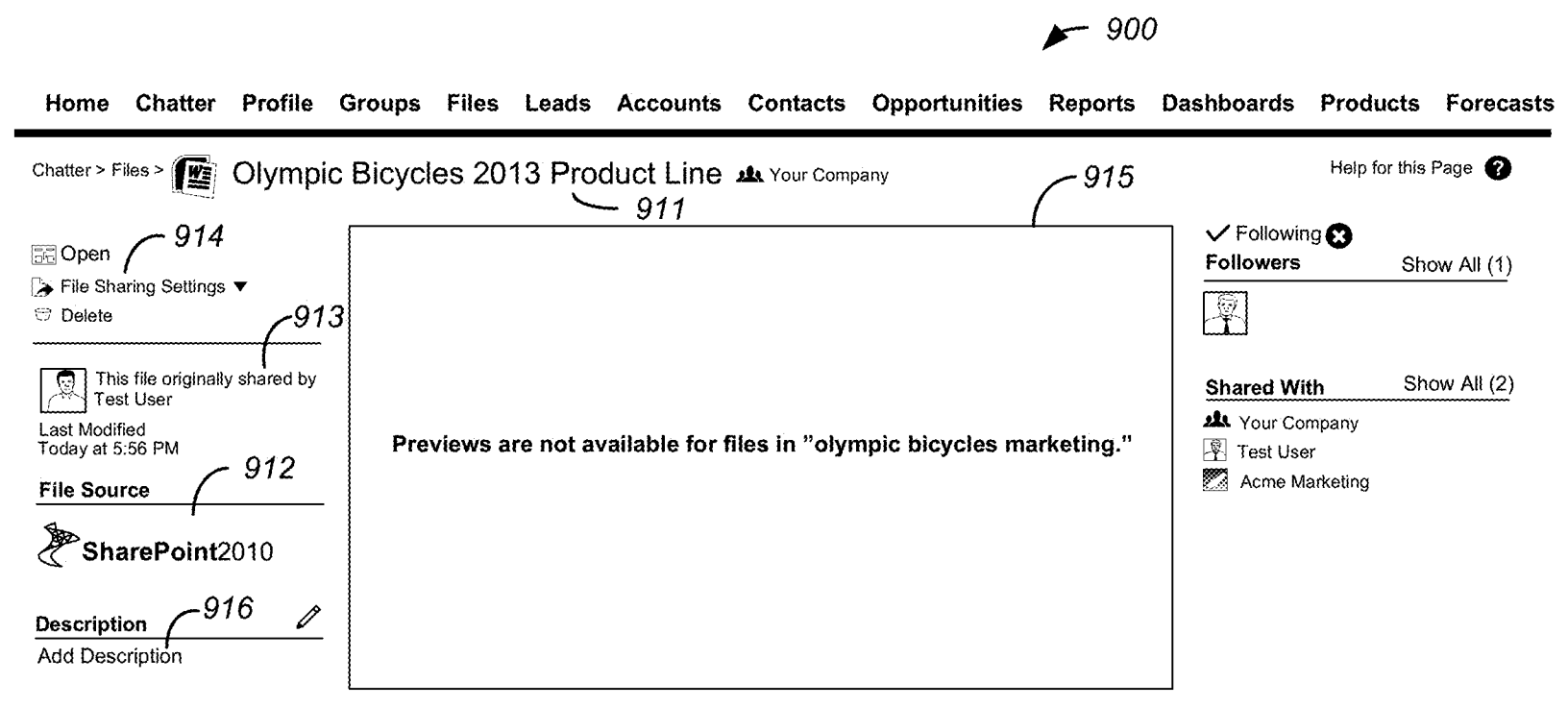

In some implementations, the user input selecting the reference can initiate an action to open a detailed information page regarding the persistent object corresponding to the external content object. Different information and capabilities can be displayed in the detailed information page depending on the source of the content object. FIG. 9 shows an example of a user interface including a detailed information page displaying data regarding a persistent object. A user interface 900 for a detailed information page includes a title or reference 911 for the persistent object corresponding to the content object, and a source 912 of the content object. The user interface 900 can further include additional metadata 913 regarding the persistent object. This can include when the persistent object was originally shared, by whom the persistent object was originally shared, and when the persistent object was last modified. In addition, the user interface 900 can include capabilities 914 for interacting with the external content object via the persistent object, such as opening the content object from the external data repository, deleting the content object, and editing file sharing settings. In some implementations, a preview window 915 may display a preview of the content object. However, previews may typically be unavailable for content objects stored in external content repositories. The user interface 900 can also include a description 916, which can be added by a user input to the persistent object corresponding to the content object. In some implementations, changes to data regarding the persistent object can be written to the corresponding content object. Accordingly, a description provided from a SharePoint document can be updated by a user using the on-demand database service, and the updates can be subsequently saved to SharePoint.

Figure 6A:
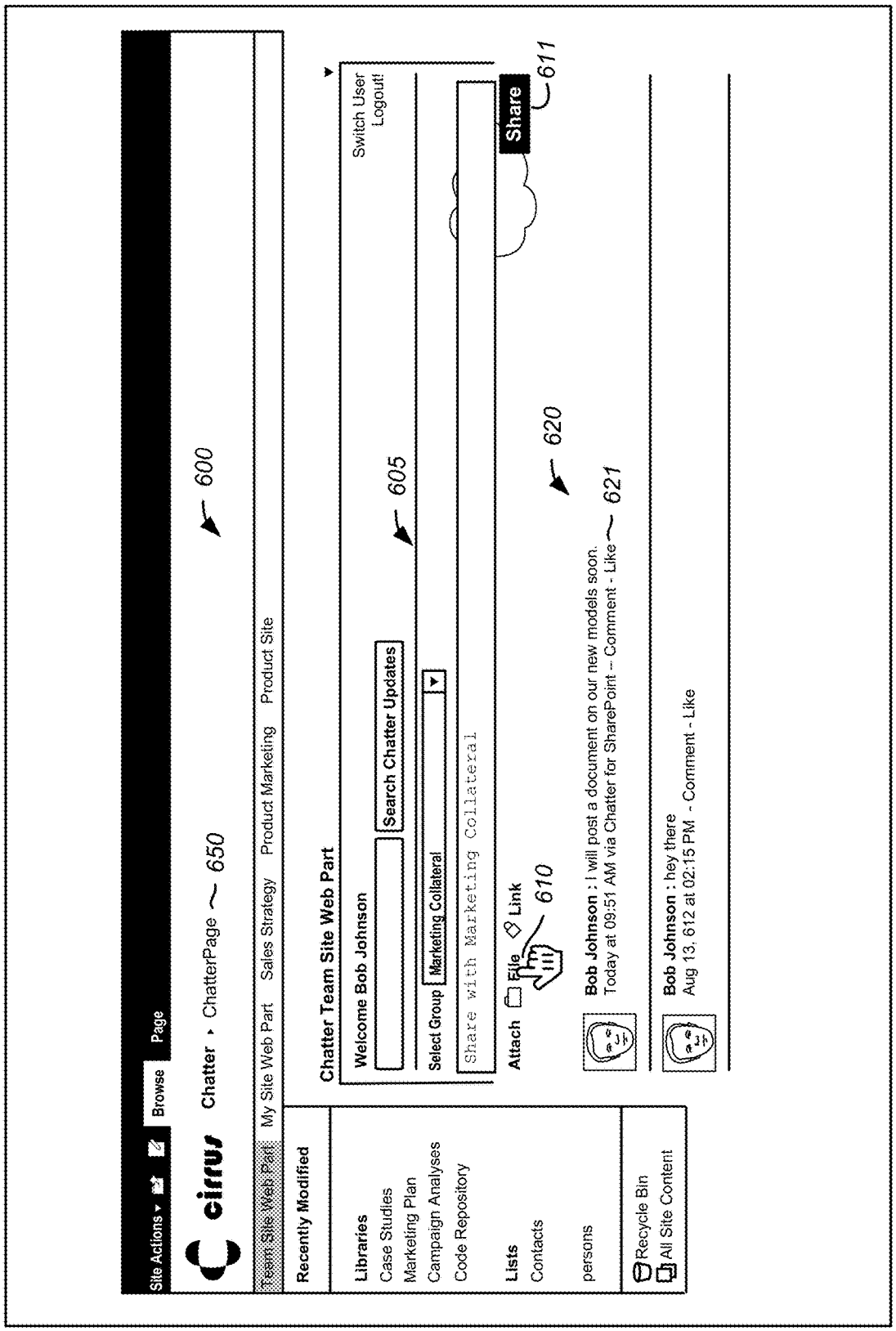
FIG. 6A shows an example of a user interface for accessing an external content management data repository with a plug-in for publishing to an on-demand database service.

FIGS. 6A-9 show various stages and aspects of providing a reference to a persistent object to social layers of an on-demand database service, where the persistent object represents an external content object. FIGS. 6A and 6B show that the reference to the persistent object can be provided from the external data repository into the social layer. FIGS. 7 and 8 show the reference to the persistent object can be propagated in an information feed as well as a content management files list. FIG. 9 shows an example of a detailed information page of data regarding the persistent object upon opening the reference.

FIG. 6A shows an example of a user interface for accessing an external content management data repository with a plug-in for publishing to an on-demand database service. The external content repository can have an API for exposing a social media page of the on-demand database service. The API can be a browser plug-in that facilitates communication between a third-party page and the browser page. Here, a SharePoint site exposes a Chatter page with a Chatter feed.

A user interface 600 includes a Chatter Page 650 having a publisher 605 and an information feed 620. The publisher 605 can be configured to publish information to the information feed 620. The information feed 620 can include one or more feed items 621 providing updates to the information feed 620. A user can choose to attach a file 610 in the publisher 605 to publish into the information feed 620. The user can choose from a plurality of files stored in the SharePoint content management data repository.

Figure 6B:
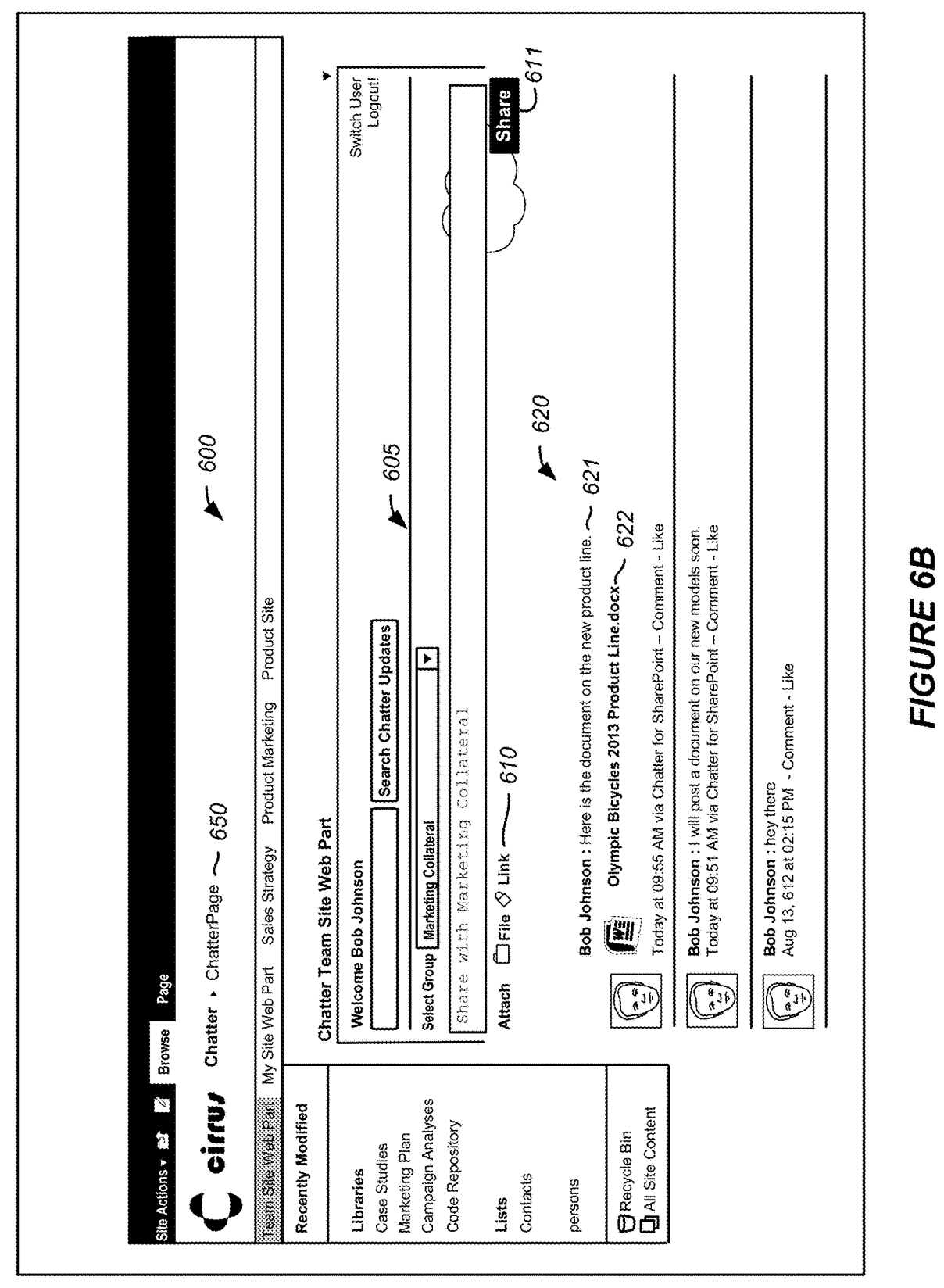

FIG. 6B shows an example of a user interface of FIG. 6A updated to include a published feed item having a reference corresponding to a content object stored in the external content management data repository. After a user selects a file stored in the SharePoint content management data repository, the user can select Share 611 in the publisher 605 to provide a reference 622 in a feed item 621 of the information feed 620. The feed item 621 can also include a message accompanying the reference as well as a timestamp of the posted feed item 621. Users can also have the option to comment and/or like the feed item 621.

FIG. 7 shows an example of another user interface with the published feed item in FIG. 6B having the reference corresponding to the content object stored in the external content management data repository. A user interface 700 includes a Group page 750 that mirrors the Chatter page 650 in FIGS. 6A and 6B. The Group page 750 includes a publisher 750 and an information feed 720, where the information feed 720 includes a feed item 721 having a reference 722 corresponding to the filed stored in the SharePoint content management data repository. The reference 722 may represent a persistent object stored in a database of the on-demand database service. While the persistent object behaves as a record in the database of the on-demand database service, the persistent object is not the external content object or a copy of the external content object itself. The persistent object is not be synchronized with the external content object. Rather, the persistent object corresponds to the external content object and includes a URL or unique content object ID of the external content object. A user can access the external content object through the persistent object while having the external content object remain in its original data repository. In FIG. 7, the user can click a selectable component 723 to open or otherwise initiate an action to interact with the external content object through the persistent object.

FIG. 8 shows an example of a user interface displaying a content files list including the reference corresponding to the content object stored in the external content management data repository of FIG. 7. A user interface 800 includes a content management files list 810 displaying a plurality of files 820. The plurality of files 820 can include a reference 821 corresponding to the file stored in the SharePoint content management data repository. Like the reference 722 in FIG. 7, the reference 821 represents the persistent object in the database of the on-demand database system. When the reference 722 is provided in a social layer of the on-demand database service, the reference 722 can be shared and propagated into other social layers of the on-demand database service. In the content management files list 810, the reference 821 is provided alongside files that are native to the on-demand database service and other references that correspond to other external content objects. The files and references can be ones that are owned by the user, shared with the user, and followed by the user. The files and references can be indexed and searchable within the database. Therefore, the persistent object represented by the reference 821 can be indexed and searchable alongside other objects stored in the database. The user can upload additional files into the content management files list 810 by selecting an Upload Files button 811 or by dragging files directly into the user interface 800.

FIG. 9 shows an example of a user interface including a detailed information page displaying data regarding a persistent object from FIGS. 7 and 8. A user interface 900 includes a detailed information page view of a title or reference 911 corresponding to the external content object. A user may initiate an action to open the detailed information page view of the reference 911 by clicking on the reference 722 in FIG. 7 or the reference 821 in FIG. 8. The detailed information page view can include metadata 912, 913, and 916 regarding the persistent object, where the metadata can relate to the external content object or retrieved from the external content object. The detailed information page view can also include capabilities 914 for interacting with the external content object via the persistent object.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system for team sharing of third-party files and team collaboration, the system comprising:
a database system implemented using a server system comprising one or more hardware processors, the database system configurable to cause:
processing user input, the processing of the user input comprising identifying the user input as requesting that one or more third-party files be shared in a chat-based workspace comprising one or more channels configured to provide online conversation for collaboration by a team of users, the one or more third-party files being stored in a cloud-based third-party storage location external to the chat-based workspace;
importing the one or more third-party files from the third-party storage location into the chat-based workspace at least in part by generating or updating one or more persistent objects to store, in a database of the database system:
at least a portion of file data of the one or more third-party files as stored in the third-party storage location, and
one or more references to the one or more third-party files as stored in the third-party storage location;
sharing the imported one or more third-party files in the one or more channels of the chat-based workspace;
processing online conversation data regarding the shared one or more third-party files, the online conversation data shared in the one or more channels by one or more users of the team of users, the processing of the online conversation data comprising associating the online conversation data with the one or more references to the one or more third-party files as stored in the third-party storage location;
processing a search request received from a computing device, the processing of the search request comprising performing a file search in the database to identify at least one of the shared one or more third-party files as satisfying the search request; and
providing a search result to the computing device, the search result identifying:
the at least one shared third-party file, and
the online conversation data.

2. The system of claim 1, the database system further configurable to cause:
processing conversation selection input, the conversation selection input selecting a conversation in the one or more channels;
processing cloud storage service input, the cloud storage service input selecting the third-party storage location from a plurality of third-party storage locations; and
processing file selection input, the file selection input selecting the one or more third-party files.

3. The system of claim 1, the database system further configurable to cause:
processing further user input selecting a folder linked with the third-party storage location to add to the one or more channels; and
processing file selection input selecting the one or more third-party files to upload to a conversation in the one or more channels.

4. The system of claim 1, the database system further configurable to cause:
indexing the imported one or more third-party files to create or update an index capable of being used for the file search.

5. The system of claim 1, wherein an imported third-party file is expandable when displayed to show one or more types of the imported file and one or more origins of the imported file.

6. The system of claim 1, wherein the third-party storage location is associated with one or more of: Dropbox, Box.net, Google Drive, SharePoint, FileNet, Documentum, Skydrive, EverNote, YouTube or Flickr.

7. The system of claim 1, wherein a reference to a third-party file comprises at least one of a Uniform Resource Locator (URL) or a unique content object identifier.

8. A computer program product comprising computer-readable program code capable of being executed by one or more processors when retrieved from a non-transitory computer-readable medium, the program code comprising instructions configurable to cause:
processing user input, the processing of the user input comprising identifying the user input as requesting that one or more third-party files be shared in a chat-based workspace comprising one or more channels configured to provide online conversation for collaboration by a team of users, the one or more third-party files being stored in a cloud-based third-party storage location external to the chat-based workspace;
importing the one or more third-party files from the third-party storage location into the chat-based workspace at least in part by generating or updating one or more persistent objects to store, in a database of a database system:
at least a portion of file data of the one or more third-party files as stored in the third-party storage location, and
one or more references to the one or more third-party files as stored in the third-party storage location;
sharing the imported one or more third-party files in the one or more channels of the chat-based workspace;
processing online conversation data regarding the shared one or more third-party files, the online conversation data shared in the one or more channels by one or more users of the team of users, the processing of the online conversation data comprising associating the online conversation data with the one or more references to the one or more third-party files as stored in the third-party storage location;
processing a search request received from a computing device, the processing of the search request comprising performing a file search in the database to identify at least one of the shared one or more third-party files as satisfying the search request; and
providing a search result to the computing device, the search result identifying:
the at least one shared third-party file, and
the online conversation data.

9. The computer program product of claim 8, the instructions further configurable to cause:
processing conversation selection input, the conversation selection input selecting a conversation in the one or more channels;
processing cloud storage service input, the cloud storage service input selecting the third-party storage location from a plurality of third-party storage locations; and
processing file selection input, the file selection input selecting the one or more third-party files.

10. The computer program product of claim 8, the instructions further configurable to cause:

processing further user input selecting a folder linked with the third-party storage location to add to the one or more channels; and processing file selection input selecting the one or more third-party files to upload to a conversation in the one or more channels.

11. The computer program product of claim 8, the instructions further configurable to cause:

indexing the imported one or more third-party files to create or update an index capable of being used for the file search.

12. The computer program product of claim 8, wherein an imported third-party file is expandable when displayed to show one or more types of the imported file and one or more origins of the imported file.

13. The computer program product of claim 8, wherein the third-party storage location is associated with one or more of: Dropbox, Box.net, Google Drive, SharePoint, FileNet, Documentum, Skydrive, EverNote, YouTube or Flickr.

14. The computer program product of claim 8, wherein a reference to a third-party file comprises at least one of a Uniform Resource Locator (URL) or a unique content object identifier.

15. A method comprising:

processing user input, the processing of the user input comprising identifying the user input as requesting that one or more third-party files be shared in a chat-based workspace comprising one or more channels configured to provide online conversation for collaboration by a team of users, the one or more third-party files being stored in a cloud-based third-party storage location external to the chat-based workspace;

importing the one or more third-party files from the third-party storage location into the chat-based workspace at least in part by generating or updating one or more persistent objects to store, in a database of a database system:

at least a portion of file data of the one or more third-party files as stored in the third-party storage location, and one or more references to the one or more third-party files as stored in the third-party storage location;

sharing the imported one or more third-party files in the one or more channels of the chat-based workspace;

processing online conversation data regarding the shared one or more third-party files, the online conversation data shared in the one or more channels by one or more users of the team of users, the processing of the online conversation data comprising associating the online conversation data with the one or more references to the one or more third-party files as stored in the third-party storage location;

processing a search request received from a computing device, the processing of the search request comprising performing a file search in the database to identify at least one of the shared one or more third-party files as satisfying the search request; and providing a search result to the computing device, the search result identifying:

the at least one shared third-party file, and the online conversation data.

16. The method of claim 15, further comprising:

processing conversation selection input, the conversation selection input selecting a conversation in the one or more channels;

processing cloud storage service input, the cloud storage service input selecting the third-party storage location from a plurality of third-party storage locations; and processing file selection input, the file selection input selecting the one or more third-party files.

17. The method of claim 15, further comprising:

processing further user input selecting a folder linked with the third-party storage location to add to the one or more channels; and processing file selection input selecting the one or more third-party files to upload to a conversation in the one or more channels.

18. The method of claim 15, further comprising:

indexing the imported one or more third-party files to create or update an index capable of being used for the file search.

19. The method of claim 15, wherein an imported third-party file is expandable when displayed to show one or more types of the imported file and one or more origins of the imported file.

20. The method of claim 15, wherein the third-party storage location is associated with one or more of: Dropbox, Box.net, Google Drive, SharePoint, FileNet, Documentum, Skydrive, EverNote, YouTube or Flickr.

\* \* \* \* \*